May 2, 1950     D. S. SALMI     2,505,915
THREADLESS BOLT
Filed March 17, 1945
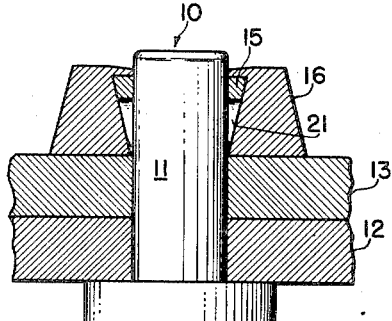
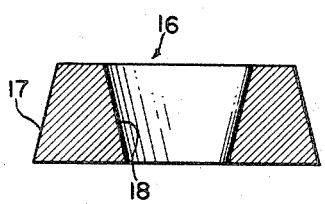
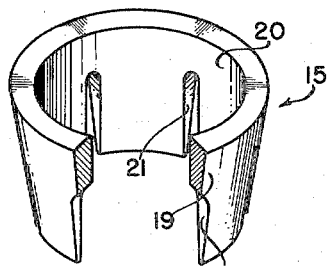
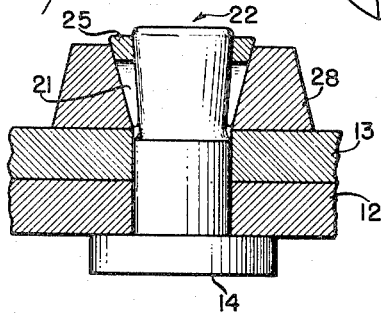
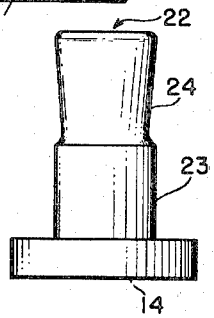
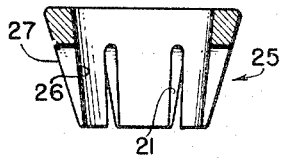
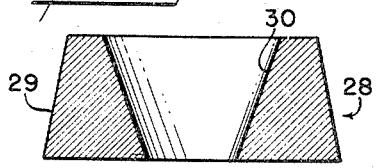
*INVENTOR.*
DOUGLAS S. SALMI
BY
Agent Patented May 2, 1950

2,505,915

UNITED STATES PATENT OFFICE 2,505,915

THREADLESS BOLT

Douglas S. Salmi, Roscoe, Calif., assignor to Lockheed Aircraft Corporation, Burbank, Calif.

Application March 17, 1945, Serial No. 583,212

2 Claims. (Cl. 85—5)

This invention relates to improvements in fastening devices, and more particularly to the general class including bolts and rivets or like securing devices used as a connection between plates and between plates and a support therefor.

The usual method of fastening metal plates, and the like, together, is by the use of bolts and nuts, or by means of conventional upsettable rivets formed of a relatively soft metal adapted for cold upsetting. This type of rivet can be quickly driven, but has the disadvantage of having a low resistance to shearing stresses, and is subject to the poor results commonly met with in riveting, such as off-center heads and bulging of the body of the rivet between the surfaces that are intended to be clamped together.

Where a high shear load must be borne, it is common practice to use bolts, washers and self-locking nuts in place of rivets, which introduces some of the shortcomings of the bolt and nut combination, such as weakening through excessive wrench pressure, working loose because of insufficient wrench pressure, the bolt being too short so that some of the threaded (and weaker) portion is included within the load-bearing area, or the bolt being too long, so that some of the unthreaded portion enters the nut, resulting in damage to the threads and weakening of the nut.

One of the objects of the invention is to overcome the disadvantages hereinabove pointed out through the provisions of an improved fastening device of the rivet type which does not require the body of the rivet to be headed up, thereby permitting the use of materials capable of withstanding high shear and tension loads.

Another object of the invention is to provide a fastening device that can be applied as quickly and easily as the conventional upsettable rivet, and yet avoid the poor results commonly met with in riveting by providing a more positive clamping action on the parts joined without deforming the sheets.

A further object of the invention is to provide a fastening device without threads that overcomes the shortcomings of the bolt and nut combination by gripping the pin tighter when a load is applied, thereby preventing the device from working loose or slipping.

A further object of the invention is to provide a fastening device in which the pin is pre-loaded as a result of driving, and in which the residual tensile stress obtained in the pin is dependent on the force used to drive the wedge.

Another object of the invention is to provide a fastening device in which the full tension and shear value of the pin is developed.

A further object of the invention is to provide a fastening device that is economical of manufacture, relatively simple, and yet produces a much greater uniformity of result.

Other objects and advantages of the invention will become apparent from the following detailed description of typically preferred forms of the invention in which references will be made to the accompanying drawing.

In the drawing,

Figure 1 is a vertical sectional view showing the fastening device at the completion of the setting operation;

Figure 2 is a lonigtudinal sectional view through the collar;

Figure 3 is an enlarged fragmentary perspective view of the wedge;

Figure 4 is a vertical sectional view showing a modified form of the fastening device at the completion of the setting operation;

Figure 5 is an elevation of the modified pin shown in Figure 4;

Figure 6 is a longitudinal sectional view through the wedge used in the modified form; and Figure 7 is a longitudinal sectional view through the collar used in the modified form.

Referring to the drawing, one method of embodying the invention is shown in Figure 1, wherein a rigid alloy steel pin 10, has a stem 11 designed to fit snugly in openings in the sheets or plates 12 and 13 that are to be secured together. The pin has an enlarged preformed head 14 for engaging one of the parts 12, 13, and is held in place by means of a wedge 15, driven between the stem 11 and a malleable collar 16.

The collar 16, shown in Figure 2, has an exterior wall 17 tapered outwardly from the top of the collar, and an inner surface 18 tapered inwardly from the top of the collar to abut the outer surface of the wedge 15.

In Figure 3 is shown one form of the wedge 15, comprising an external wall 19 tapered inwardly from the top of the wedge to abut the internally tapered surface 18 of the collar 16, and an internal surface 20, generally cylindrical in form, adapted to abut the surface of the stem 11. A plurality of slots 21, running parallel to the axis, permit contraction of the wedge on driving. The wedge is preferably formed of steel, and the composition of the collar is dependent upon the strength desired, aluminum or steel being the preferred forms.

To apply the fastening device embodied in this invention, the stem 11 of the pin 10 is passed through the prepared holes in the members to be fastened together, such as metal plates 12 and 13, so that the head 14 seats against one side of these plates and the stem 11 protrudes from the other side. The wedge 15 is held in place before driving by crimping the top portion of the collar 16 over the top of the wedge 15. The collar 16 and the wedge 15 are then passed over the end of the pin 10 and seated against the adjacent face of the plates. While the head of the pin is held securely against one side of the plates, a cylindrical set (not shown here) is used to force the top of the collar down over the top of the wedge, driving it between the collar and the pin until tight, thereby pre-loading the pin, and providing a lock which will prevent slippage between the pin and the collar when a load is applied.

The embodiment of this invention could be modified as shown in Figure 4. The pin 22 comprises an enlarged preformed head 14 on one end, a surface 24 on the other end tapering inwardly from the end of the pin and adapted to abut the inner surface 26 of the wedge 25, and a stem 23 joining the two ends and designed to fit snugly in openings in the sheets or plates 12 and 13 that are to be secured together.

The wedge 25 used in the modified form of the invention and detailed in Figure 6, comprises an inner surface 26 tapered inwardly from the top of the wedge to abut the tapered surface 24 on the end of the pin 22, and an outer surface 27 tapered inwardly from the top of the wedge at a greater angle than the inner surface so that the wedge tapers from a thick portion at the top to a thin edge at the bottom. A plurality of slots 21 running parallel to the axis, permits contraction of the wedge on driving.

The collar 28 shown in Figure 7, is designed to fit the modified wedge rivet, and is similar to the collar used in the preferred form of the invention. It comprises an exterior wall 29 tapered outwardly from the top of the collar, and an inner surface 30 tapered inwardly from the top of the collar to abut the outer surface 27 of the wedge 25.

To apply the fastening device embodied in the modified form of this invention, the stem of the pin 22 is passed through the aligned holes in the members to be fastened together, so that the head 14 seats against one side of these plates and the tapered surface 24 protrudes from the other side. The collar 28 is passed over the end of the pin 22 and seated against the adjacent face of the plates. While the head of the pin is held securely against one side of the plates, the wedge 25 is passed over the end of the pin and driven between the inner surface 30 of the collar 28, and the tapered end 24 of the pin 22. The wedge provides a positive lock that grips the pin tighter when a load is applied, thereby preventing the device from working loose or slipping.

While I have described herein some embodiments of my invention, the construction is, of course, subject to variations and modifications without departing from the spirit and scope of the invention. I therefore do not intend to be limited to the specific details herein set forth, but desire to reserve to myself any variations or modifications that may appear to those skilled in the art, or fall within the scope of the following claims.

I claim:
1. A high shear load sustaining rivet comprising a substantially non-upsettable rivet pin for extending through the structure to be riveted, the pin having an enlarged integral head at one end for engaging one side of said structure and having a tapered shank portion at its other end, the maximum diameter of the shank portion being no greater than the maximum diameter of the pin and presenting an external surface which tapers radially and axially outward with respect to the head, a collar encircling the shank portion for engaging the other side of said structure and having an internal surface tapered in the same direction as said surface of the shank portion but at a greater angle, and an annular radially contractable wedge forcibly engaging between said shank portion and the inner surface of the collar and having tapered internal and external surfaces respectively conforming to and frictionally engaging said surfaces of the shank portion and collar to prevent slippage between the pin and collar.

2. A high shear load sustaining rivet comprising a substantially non-upsettable rivet pin including a pin body for extending through aligned openings in the structure to be riveted, an enlarged head integral with one end of the pin body for engaging one side of said structure, and a shank portion integral with and continuing from the other end of the pin body for protruding beyond the other side of said structure, said shank portion presenting an external surface which tapers radially and axially outward with respect to the pin body but which has a maximum diameter no greater than the maximum diameter of the pin body, a collar arranged around the shank portion for engaging the other side of said structure and provided with an internal surface tapered in the same direction as said surface of the shank portion but at a greater angle, and a continuous annular wedge having spaced axial slots to render it radially contractable and tightly wedged between said surfaces of the shank portion and collar, the wedge having tapered internal and external surfaces respectively conforming with said surfaces of the shank portion and collar and frictionally cooperating with the same to provide a lock for preventing slippage between the pin and collar.

DOUGLAS S. SALMI.

REFERENCES CITED

The following references are of record in the file of this patent:

UNITED STATES PATENTS

| Number | Name | Date |
| --- | --- | --- |
| 130,049 | Higgins | July 30, 1872 |
| 310,360 | Banser | Jan. 6, 1885 |
| 339,951 | Wahlert | Apr. 13, 1886 |
| 1,038,834 | Bloom | Sept. 17, 1912 |
| 1,083,471 | Walton & Gotwalt | Jan. 6, 1914 |
| 1,185,402 | Hopkins | May 30, 1916 |
| 1,470,528 | Flentjen | Oct. 9, 1923 |
| 1,480,485 | Yonce | Jan. 8, 1924 |
| 1,913,408 | Paul | June 13, 1933 |
| 1,937,086 | Kaplan | Nov. 28, 1933 |
| 2,021,051 | Desbrueres | Nov. 12, 1935 |
| 2,028,881 | Saleh | Jan. 28, 1936 |
| 2,052,793 | Peirce | Sept. 1, 1936 |